(12) United States Patent
Talarico et al.

(10) Patent No.: US 11,996,942 B2
(45) Date of Patent: May 28, 2024

(54) REPETITION SCHEMES FOR URLLC OPERATING IN UNLICENSED SPECTRUM

(71) Applicant: Intel Corporation, Santa Clara, CA (US)

(72) Inventors: Salvatore Talarico, Los Gatos, CA (US); Sergey Panteleev, Nizhny Novgorod (RU); Debdeep Chatterjee, San Jose, CA (US); Toufiqul Islam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 17/502,155

(22) Filed: Oct. 15, 2021

(65) Prior Publication Data
US 2022/0038211 A1 Feb. 3, 2022

Related U.S. Application Data

(60) Provisional application No. 63/121,764, filed on Dec. 4, 2020, provisional application No. 63/092,940, filed on Oct. 16, 2020.

(51) Int. Cl.
| | |
|---|---|
| *H04L 1/08* | (2006.01) |
| *H04W 16/14* | (2009.01) |
| *H04W 72/23* | (2023.01) |
| *H04W 74/0808* | (2024.01) |

(52) U.S. Cl.
CPC ............. *H04L 1/08* (2013.01); *H04W 16/14* (2013.01); *H04W 72/23* (2023.01); *H04W 74/0808* (2013.01)

(58) Field of Classification Search
CPC .......... H04L 1/08; H04L 1/189; H04W 16/14; H04W 72/23; H04W 74/0808
See application file for complete search history.

(56) References Cited

U.S. PATENT DOCUMENTS

| | | | | |
|---|---|---|---|---|
| 11,503,639 | B2 * | 11/2022 | Myung | ............. H04W 74/0808 |
| 11,617,202 | B2 * | 3/2023 | Myung | ................. H04L 5/0053 |
| | | | | 370/329 |
| 11,825,469 | B2 * | 11/2023 | Yang | ..................... H04W 72/23 |
| 11,843,935 | B2 * | 12/2023 | You | ....................... H04L 5/0044 |
| 2020/0052827 | A1 * | 2/2020 | Vilaipornsawai | ..... H04L 5/0044 |
| 2020/0162208 | A1 * | 5/2020 | Moon | ..................... H04L 1/189 |
| 2021/0007129 | A1 * | 1/2021 | Talarico | ............ H04W 72/1268 |

(Continued)

FOREIGN PATENT DOCUMENTS

| | | | |
|---|---|---|---|
| CN | 116158159 A | * | 5/2023 |
| WO | WO-2021140351 A1 | * | 7/2021 |

*Primary Examiner* — Ahmed Elallam
(74) *Attorney, Agent, or Firm* — Schwegman Lundberg & Woessner, P.A.

(57) ABSTRACT

An apparatus and system to enable URLLC PUSCH repetitions in the unlicensed spectrum are described. The number of consecutive PUSCH repetitions indicated in the RRC parameter is reinterpreted as the number of transmission occasions over which the UE is able to attempt CCA. An orphan symbol is used to provide a DMRS transmission or cyclic prefix of the PUSCH transmission causing the orphan symbol. Whether a CG-UCI is piggybacked in a PUSCH transmission, and whether DCI-DFI is used, is dependent on whether cg-RetransmissionTimer is configured.

20 Claims, 14 Drawing Sheets

(56) References Cited

U.S. PATENT DOCUMENTS

| | | | |
|---|---|---|---|
| 2021/0307070 A1* | 9/2021 | Kim | H04W 74/0816 |
| 2022/0104259 A1* | 3/2022 | Li | H04W 74/0816 |
| 2022/0174735 A1* | 6/2022 | Li | H04W 74/0816 |
| 2022/0183053 A1* | 6/2022 | Li | H04W 74/006 |
| 2022/0231789 A1* | 7/2022 | Ying | H04L 5/0053 |
| 2023/0171769 A1* | 6/2023 | Chen | H04L 1/189 |
| | | | 370/329 |
| 2023/0254896 A1* | 8/2023 | Guo | H04W 74/0816 |
| | | | 370/329 |
| 2023/0262689 A1* | 8/2023 | Guo | H04W 72/1268 |
| | | | 370/329 |
| 2023/0319819 A1* | 10/2023 | Wang | H04L 5/0098 |
| | | | 370/336 |
| 2023/0336286 A1* | 10/2023 | Beale | H04L 1/189 |

* cited by examiner

REPETITION SCHEMES FOR URLLC OPERATING IN UNLICENSED SPECTRUM

PRIORITY CLAIM

This application claims the benefit of priority under 35 U.S.C. 119(e) to U.S. Provisional Patent Application Ser. No. 63/092,940, filed Oct. 16, 2020, and U.S. Provisional Patent Application Ser. No. 63/121,764, filed Dec. 4, 2020, each of which is incorporated herein by reference in its entirety.

TECHNICAL FIELD

Embodiments pertain to next generation wireless communications. In particular, some embodiments relate to repetition schemes for Ultra-Reliable Low-Latency Communication (URLLC) communications in the unlicensed spectrum.

BACKGROUND

The use and complexity of wireless systems, which include 5$^{th}$ generation (5G) networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
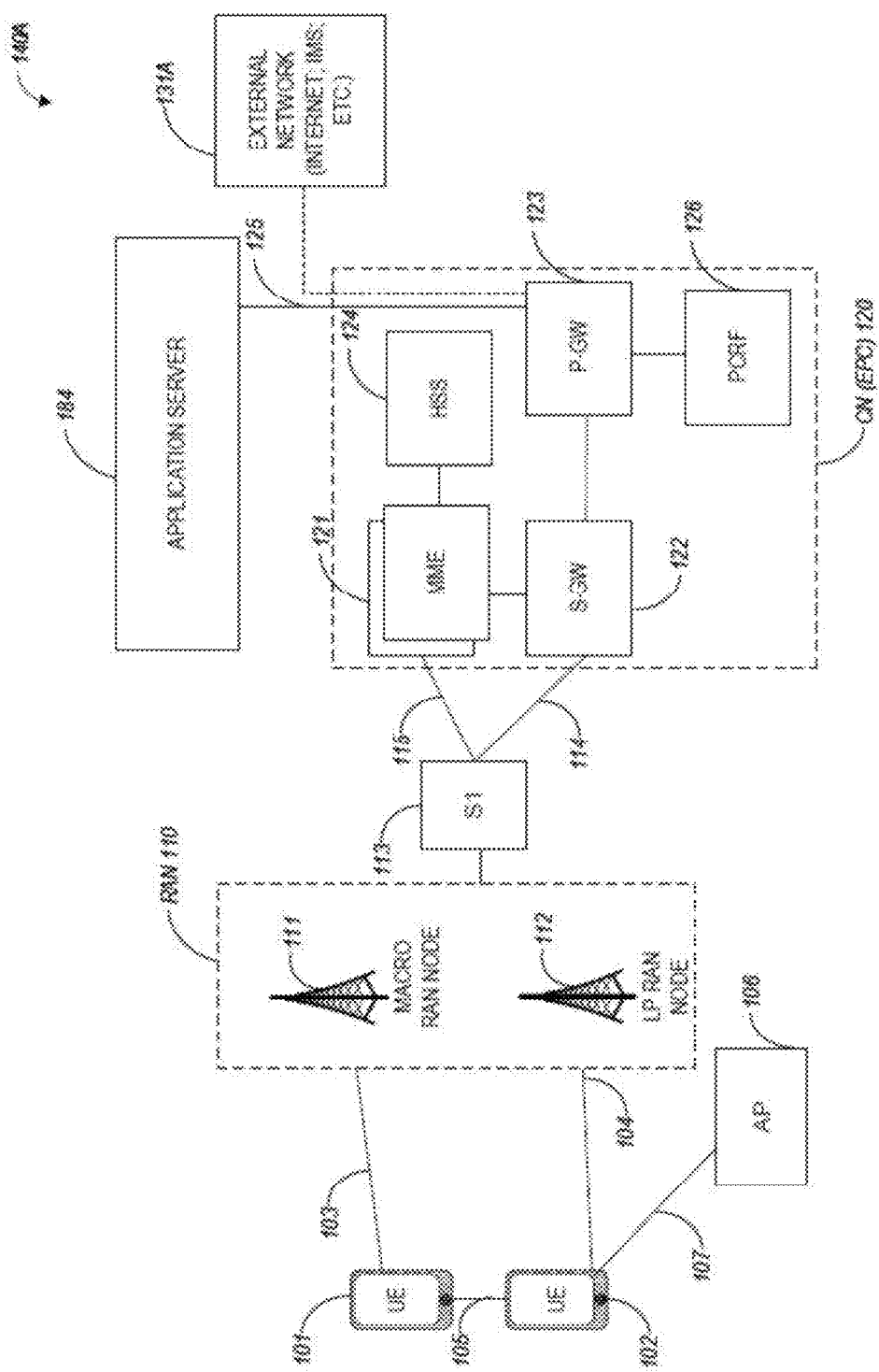
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP)

sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/ 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
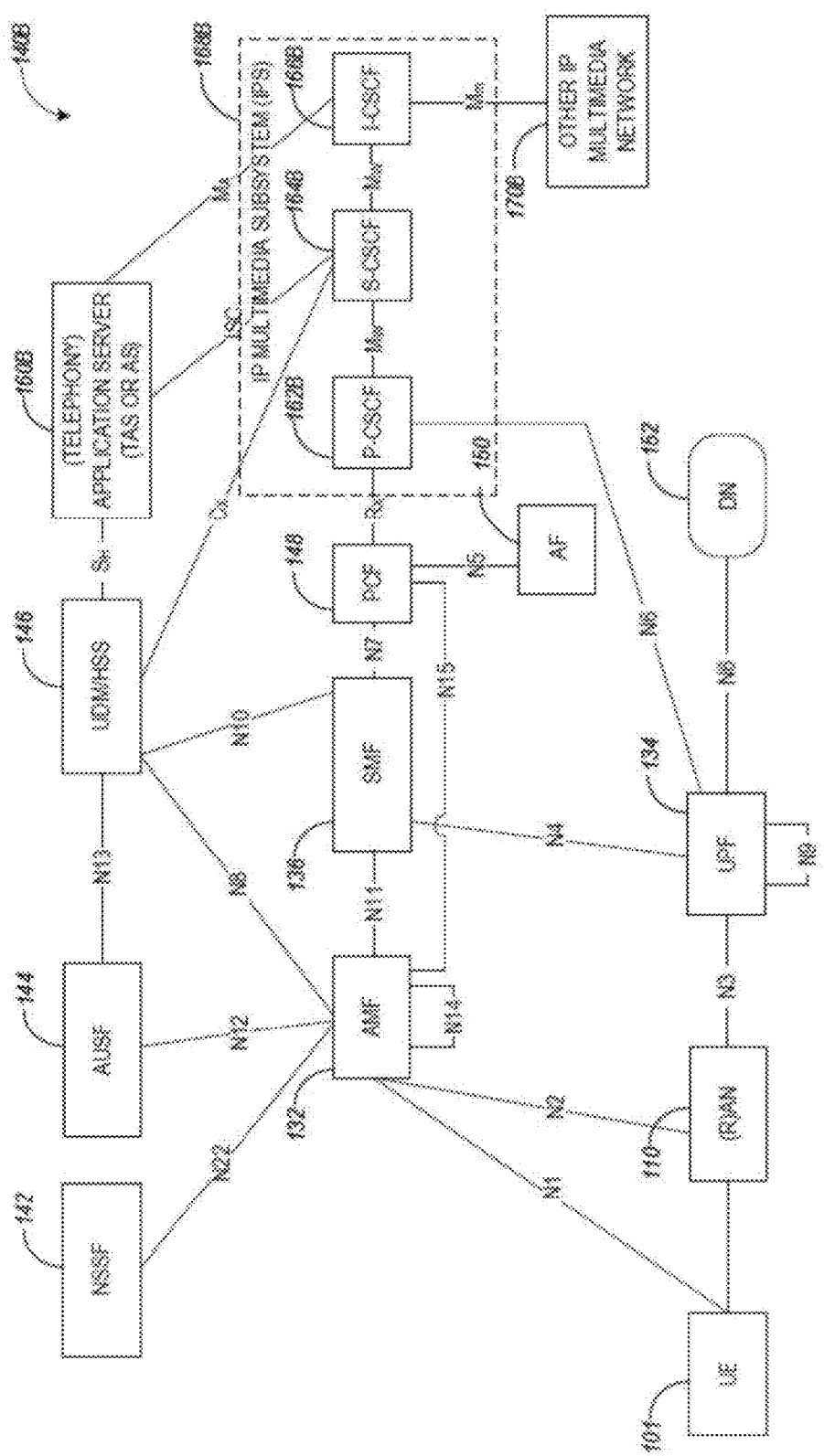
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6

(between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
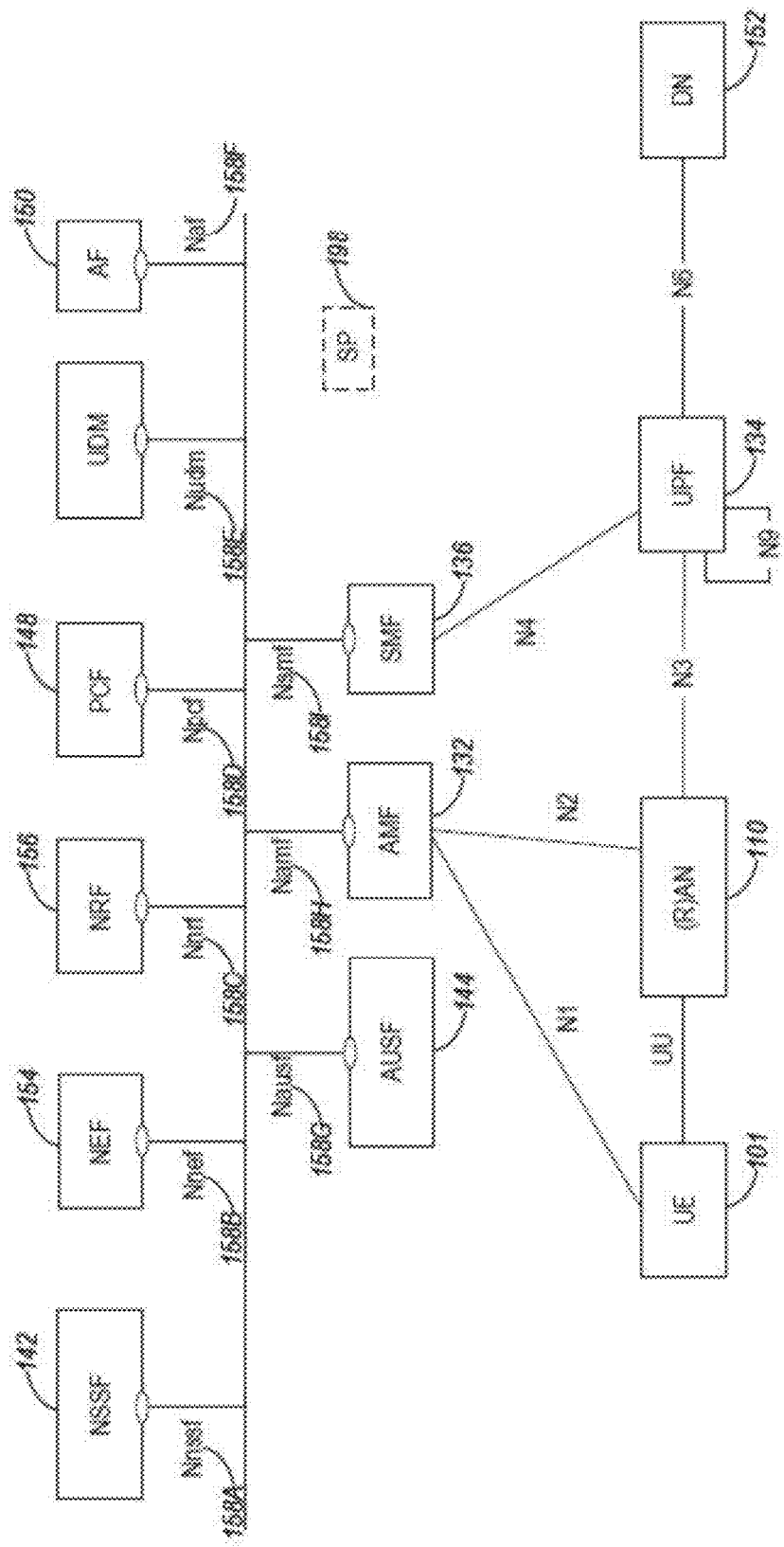
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
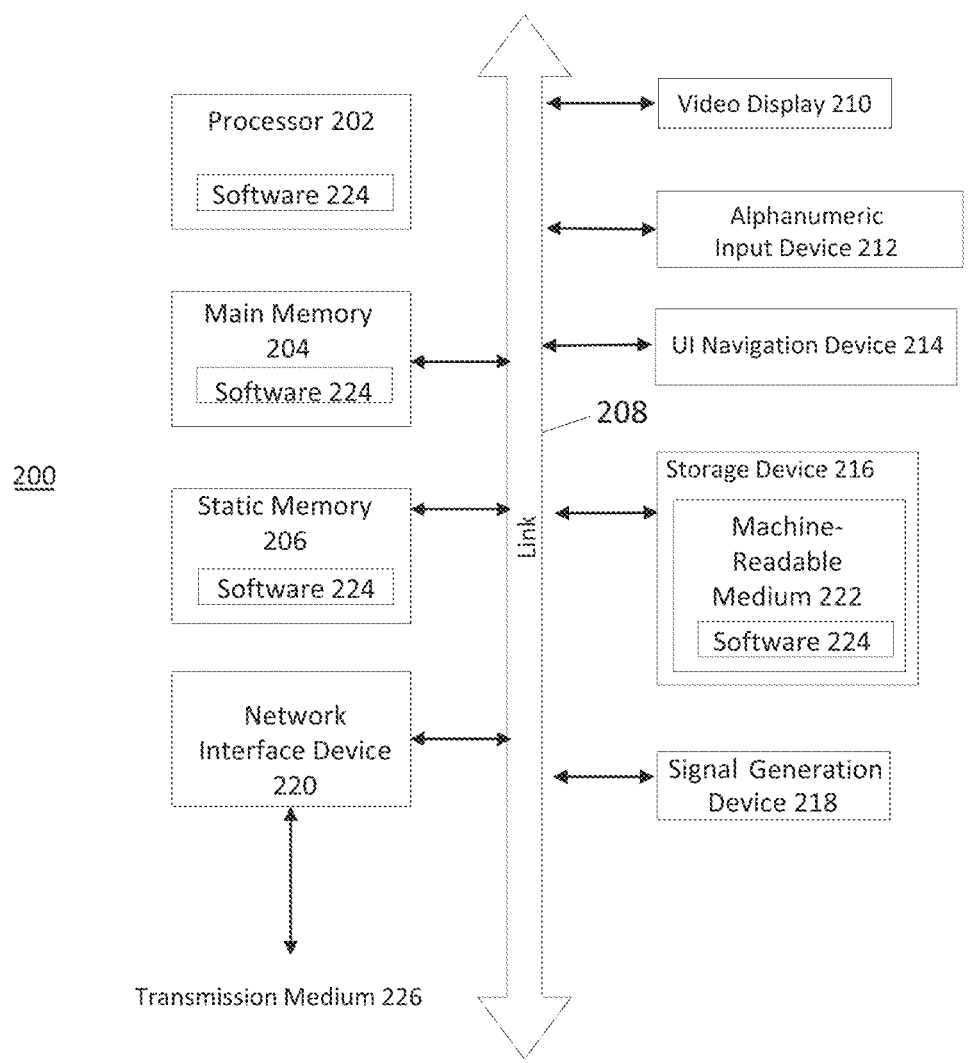
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p or IEEE 802.11 bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11 bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, the achievable latency and reliability performance of 5G systems is to be improved to support use cases with tighter requirements. Rel-16 NR evolved to support use cases, including the following: Release 15 enabled use case improvements, AR/VR (Entertainment industry), NR 16 use cases with higher requirements, factory automation, transport industry, and electrical power distribution. However, in some of the scenarios, one of the major limiting factors is still the availability of spectrum. To mitigate this, one of the objectives of Rel.17 is to identify potential enhancements to ensure Release 16 feature compatibility with unlicensed band Ultra-Reliable Low-Latency Communication (URLLC)/industrial internet of things (IIoT) operation in controlled environment.

One of the challenges is that the 5G system must comply with the regulatory requirements dictated for the sub-6 GHz band, where a LBT procedure is to be performed in some parts of the world to acquire the medium before a transmission can occur as described in ETSI EN 301 893, while still being able to guarantee the requirements in terms of reliability and latency identified for the design of URLLC/IIoT to meet the aforementioned use cases. Additional design considerations are therefore made in this regard. In fact, when operating URLLC/IIoT in the unlicensed spectrum, due to the LBT procedure and its aleatory nature, additional latency and loss in reliability may be introduced depending on the medium contention when the LBT fails.

In Rel. 15 and Rel. 16 URLLC two repetition schemes have been introduced to optimize the latency-reliability tradeoff for CG PUSCH transmissions: PUSCH repetition type A and PUSCH repetition type B.

Figure 3:
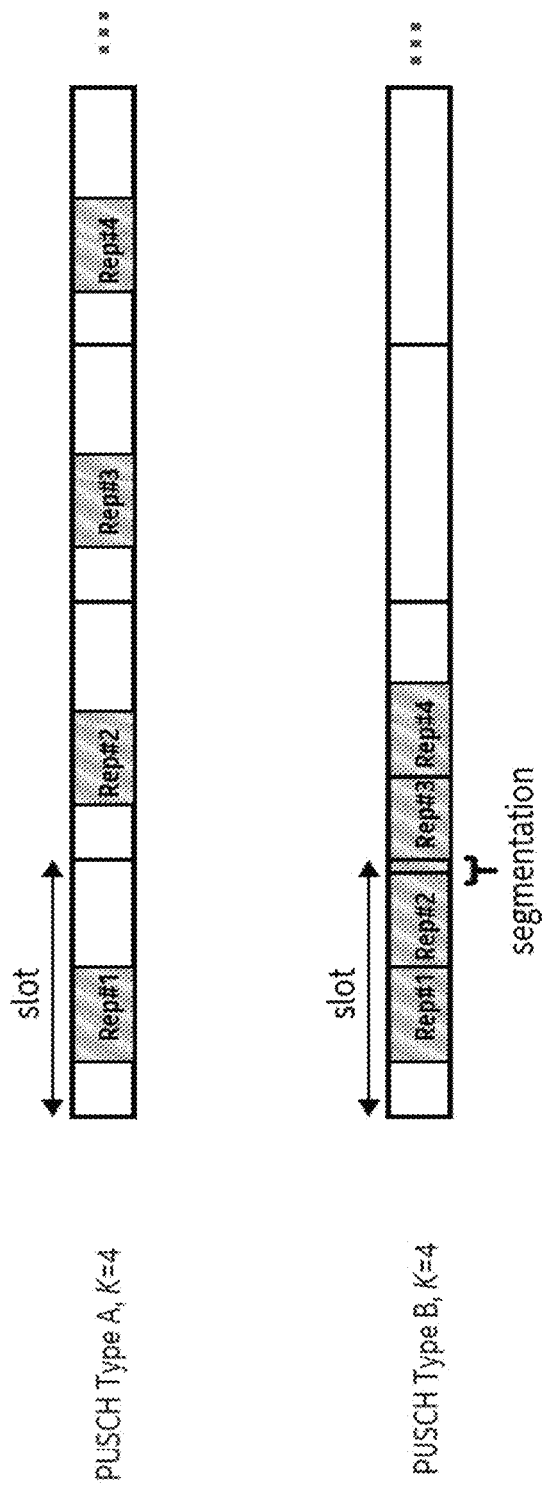
FIG. 3 illustrates physical uplink shared channel (PUSCH) transmissions in accordance with some aspects.

In PUSCH repetition type A, the number of repetitions K (or numberOfRepetitions) can be dynamically or semi-statically configured, and occur on a slot basis. Therefore, the number of repetitions also corresponds to the number of slots across which the repetitions occur. The same Start and Length Indicator Value (SLIV) associated to the first repetition in the first slot applies across all the K consecutive slots. FIG. 3 illustrates PUSCH transmissions in accordance with some aspects. In particular, the top portion of FIG. 3 shows a high-level illustration of PUSCH repetition type A for K=4.

In PUSCH repetition type B, the number of repetitions K can be dynamically or semi-statically configured and occur in a back-to-back manner with the help of segmentation. The length of the first PUSCH indicated through the SLIV associated to the first repetition applies to all the K consecutive repetitions: in other words, all the consecutive PUSCH transmissions have the same length before application of segmentation. In particular, the top portion of FIG. 3 shows a high-level illustration of PUSCH repetition type B for K=4.

For both repetition schemes, the transmission occasion on when a UE may initiate the transmission is deterministic, and initial transmission only starts at the first transmission occasion of the K repetitions. While the two aforementioned repetition schemes are meant to operate in licensed spectrum, if operated in the unlicensed sub-6 GHz band the repetition schemes may be subject to a significant amount of performance degradation, given that the repetition schemes were not designed keeping in mind that a device would be mandated to perform a Clear Channel Assessment (CCA) before transmitting within a maximum channel occupancy time (MCOT), and if within a COT a gap larger than 16 µs exists between PUSCH transmissions. In this case, if CCA procedure fails, then repetitions are unable to be transmitted in a continuous manner and a substantial latency may be induced.

Figure 4:
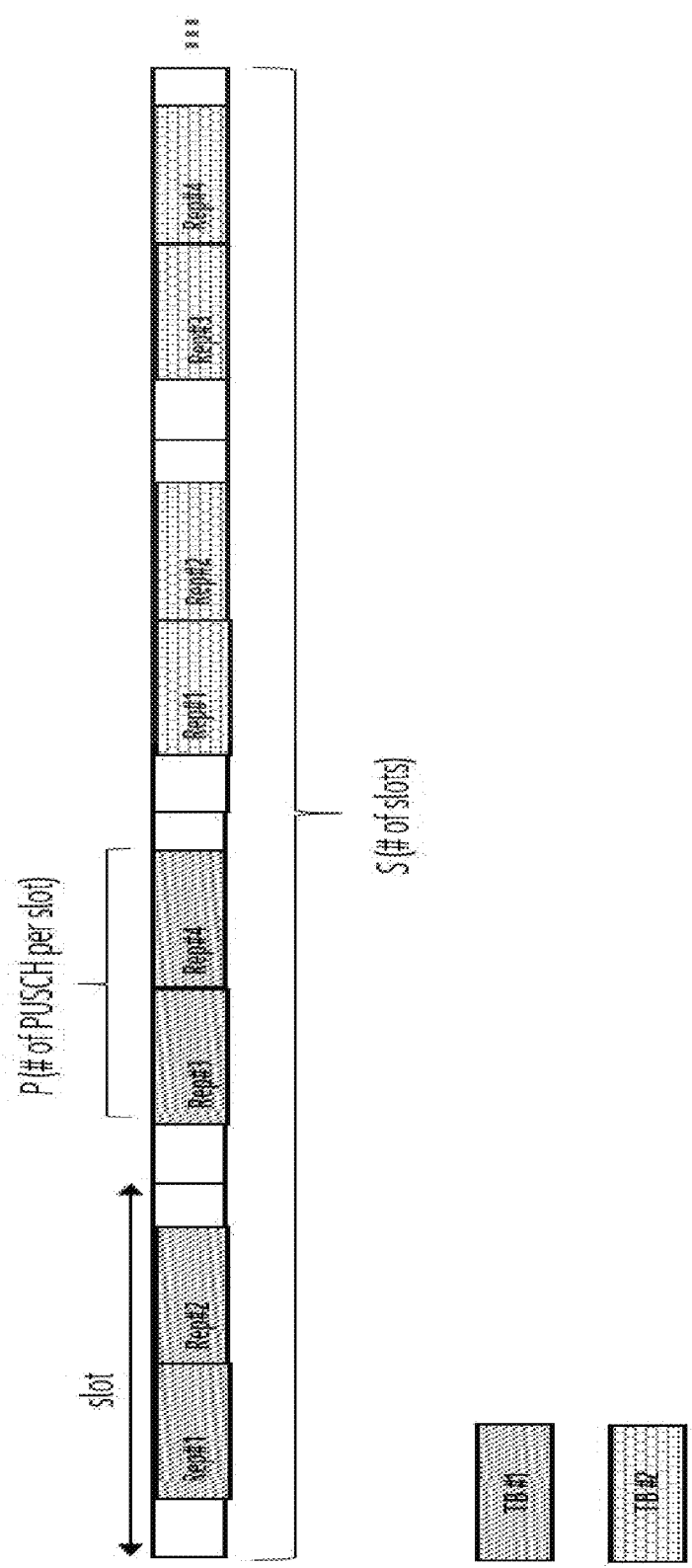
FIG. 4 illustrates new radio unlicensed band (NR-U) repetition scheme in accordance with some aspects.

On the other hand, in Rel. 16, while PUSCH repetition type B has been used as a baseline to develop a repetition scheme suitable to operate in the unlicensed spectrum, changes have been made to cope with the LBT. However, for the Rel. 16 NR-U design, some of the tight latency constrains that are strictly relevant for URLLC have not been taken into consideration. In Rel. 16 NR-U, two new Radio Resource Control (RRC) parameters have been introduced, which indicate the number of slots S and the number of PUSCH P allowed within a slot, respectively, and allow multiple transport block (TB) transmissions within a MCOT if a gap shorter than 16 µs is guaranteed between PUSCH transmissions. Similar to PUSCH repetition type B, back-to-back transmissions are allowed in NR-U, and the length of the SLIV of the first PUSCH transmission is the same for all other PUSCH transmissions but transmissions could be composed by repetitions of multiple TB, rather than a single TB. Furthermore, the number of repetitions in this case refer to the number of repetitions per TB, while a UE can perform P PUSCH transmissions within a slot, and repetitions can span potentially over S slots. FIG. 4 illustrates NR-U repetition scheme in accordance with some aspects. In particular, the high-level illustration of this framework is provided in FIG. 4 for the case when K=4, S=4 and P=2.

Moving forward to Rel. 17, a harmonization across Rel. 15/16 URLLC repetitions schemes and that introduced in Rel. 16 for NR-U is to be used for operating efficiently URLLC in the unlicensed spectrum. In this matter, embodiments herein provide several options to close the gap between the two designs and ensure an effective operation of URLLC in the shared spectrum.

Enhanced CG PUSCH Type A Repetition Scheme

Figure 5:
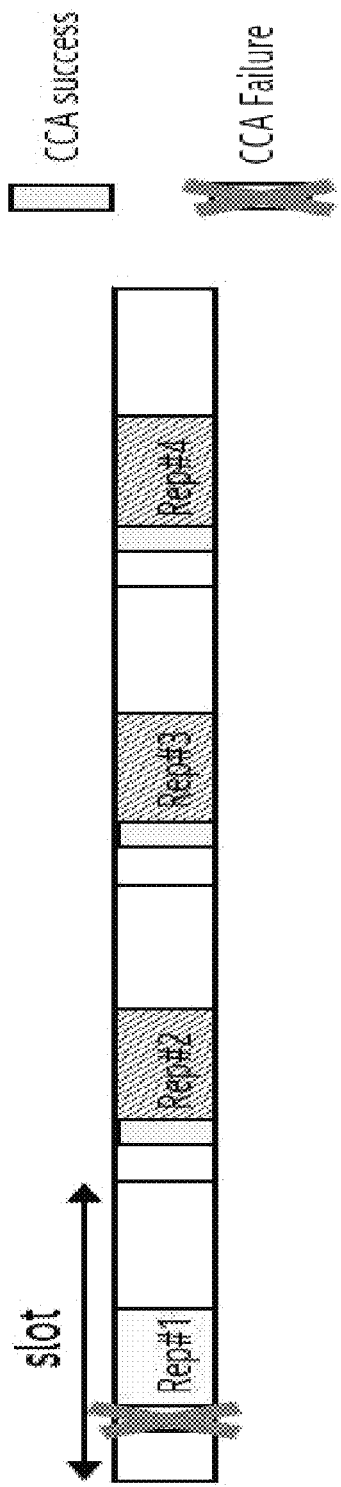
FIG. 5 illustrates transmission occasions for LBT attempts in accordance with some aspects.

In some embodiments, for the CG PUSCH type A repetition scheme, the number of consecutive repetitions is reinterpreted as the number of transmission occasions over which a UE could attempt LBT. If successful, the UE transmits a repetition or a set of repetitions if the set of repetitions are not separated in time for more than 16 µs. The number of consecutive repetitions according to the Rel. 16 URLLC design also coincide with the number of slots over which those repetitions span. FIG. 5 illustrates transmission occasions for LBT attempts in accordance with some aspects. In particular, FIG. 5 provides an example in which the number of consecutive repetitions K=4 is reinterpreted as the number of transmission occasions over which a UE could attempt LBT.

In some embodiments, for the CG PUSCH type A repetition scheme, the RRC parameters Cg-nrofPUSCH-InSlot-r16 and/or Cg-nrofSlots-r16 defined in NR-U can be reused to enhance the CG PUSCH type A repetition scheme. The RRC parameters Cg-nrofPUSCH-InSlot-r16 and/or Cg-nroSlots-r16 defined in NR-U indicate the number of PUSCH allowed per slot and the number of slots over which consecutive PUSCH transmission may span, respectively. In particular, these two parameters can be used to indicate, similarly as in NR-U, the number of PUSCH allowed per slot and the number of slots over which up to K consecutive PUSCH transmissions and/or up to K repetitions per TB may span. Given the SLIV for the first repetition in the first slot, indicating the length and the starting symbol of that PUSCH transmission: all the other consecutive PUSCHs transmitted back-to-back within a slot have the same length of the first repetition within the first slot; and all the initial repetitions within the consecutive slots Cg-nrofSlots-r16 would have the same exact SLIV as the first repetitions within the first slot.

Figure 6:
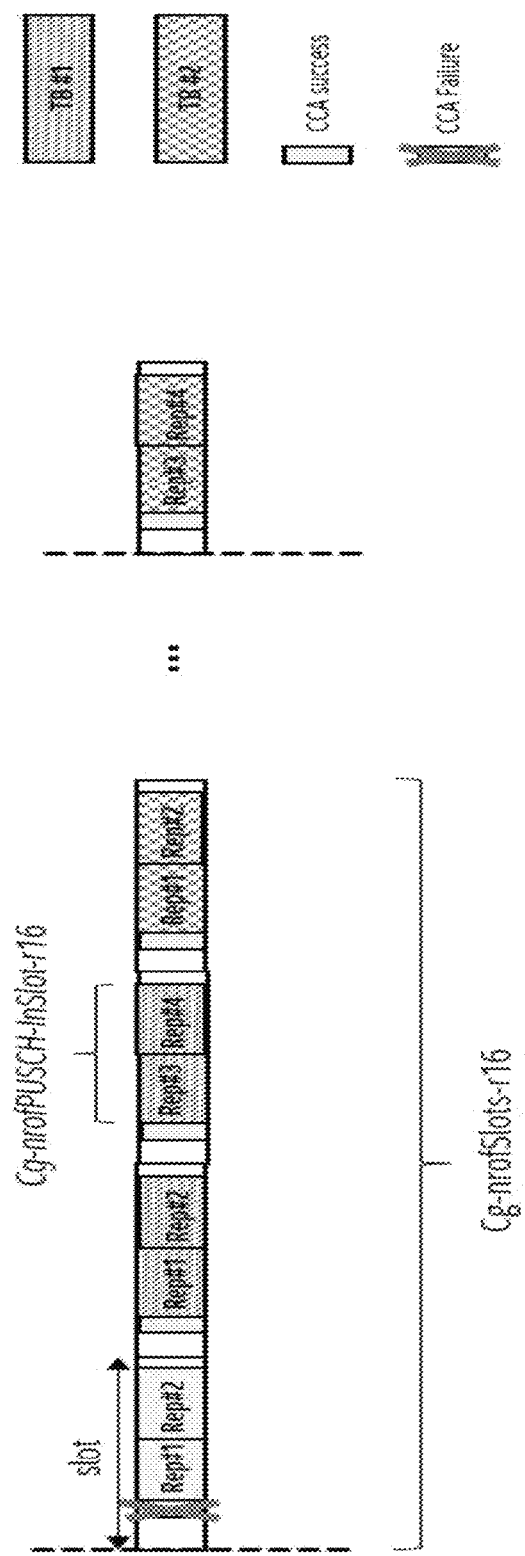
FIG. 6 illustrates an enhanced configured grant (CG) PUSCH type A repetition scheme in accordance with some aspects.

In some embodiments, for the CG PUSCH type A repetition scheme, the number of consecutive repetitions is reinterpreted as the maximum number or the number of repetitions per TB, which can be performed over the time domain resources allocated per each period through parameter Cg-nrofPUSCH-InSlot-r16 and/or Cg-nrofSlots-r16. FIG. 6 illustrates an enhanced CG PUSCH type A repetition scheme in accordance with some aspects. FIG. 6, in particular, provides an example of enhanced CG PUSCH type A repetition scheme, when Cg-nrofPUSCH-InSlot-r16=2 and Cg-nrofSlots-r16=4, and the number of repetitions is set to K=4, and is interpreted as the maximum number of repetitions per TB.

In some embodiments, for the CG PUSCH type A repetition scheme, depending on the value of Cg-nrorfPUSCH-InSlot-r16, Cg-nroSlots-r16 and number of repetitions, which is dynamically signaled, a gap larger than 16 µs may be introduced across repetitions or a group of back-to-back repetitions. In this case, type 2B channel access (if the gap is larger than 16 μs but less than 25 μs) or type 2A channel access (if the gap is larger than 25 μs) may be performed right before the UL allocated resources within a period.

In some embodiments, for the CG PUSCH type A repetition scheme, as in Rel. 16 NR-U, depending on whether the time domain resource allocations (TDRAs) fall within a UE's COT or a gNB's COT, a UE may initially perform a Cat-2 or Cat-4 LBT for the first transmission of a contiguous set of slots depending on when a UE is provided with ChannelAccessMode-r16='semistatic' by system information block1 (SIB1) or a dedicated configuration or not, respectively.

In some embodiments, if the CCA procedure fails, a UE may postpone the transmission of the repetitions scheduled for the consecutive transmissions which were scheduled to be transmitted if the CCA procedure would have succeeded to the first transmission occasion for which the UE succeeds the CCA procedure. Such an example is illustrated in FIG. 6. In another option, if the CCA procedure fails, a UE may drop/puncture the transmission of the repetitions scheduled for the consecutive transmissions which were scheduled to be transmitted if the CCA procedure would have succeeded. Such an example is illustrated in FIG. 5. In this case, if the UE relies on a redundancy version (RV) sequence, and the specific RV value to use is not left up to UE's implementation, the RV initially associated to each repetition may not be changed. Alternatively, the RV may be dropped as a transmission of the repetitions are punctured, and the UE may always associate the first element of the RV sequence to the first actual transmitted repetition.

In another option, it may be left up to UE implementation on how to handle the case when the CCA procedure fails.

In some embodiments, for the CG PUSCH type A repetition scheme, repetitions of a specific TB may occur across periodicities, as illustrated in FIG. 6, where rep #3 and #4 of TB #2 occur in a separate periodicity as rep #1 and #2 of TB #2.

In some embodiments, when a UE is provided with ChannelAccessMode-r16='semistatic' by SIB1 or a dedicated configuration by higher layer RRC signaling, whether the CG PUSCH transmission and its repetitions are performed within a gNB's FFP or a UE's FFP, if a repetition lies or overlaps within the following gNB's idle period or the following UE's idle period, respectively, that repetition and any following ones are dropped. In some embodiments, the dropped repetitions are punctured and flushed out of the UE's buffer. Alternatively, transmission of the repetitions may be resumed and performed in the following transmission occasion either within a following gNB's or a UE's FFP. In some embodiments, when a UE is provided with ChannelAccessMode-r16='semistatic' by SIB1 or a dedicated configuration by higher layer RRC signaling, any time domain resource that lies or overlaps within either the following idle period of an active gNB's FFP or an active UE's FFP (where for active, it is intended a FFP that has been able to be acquire by the initiating device, by succeeding the related CCA procedure described in TS 37.213) are considered invalid resources, and no transmission is allowed to be performed.

The embodiments listed above are not mutually exclusive, and one or more of them may apply together.

Enhanced CG PUSCH Type B Repetition Scheme

In some embodiments, for the CG PUSCH type B repetition scheme, the number of consecutive repetitions is reinterpreted as the number of transmission occasions over which a UE could attempt LBT. If successful the UE transmits a repetition or a set of repetitions if the set of repetitions are not separated in time for more than 16 μs.

Figure 7:
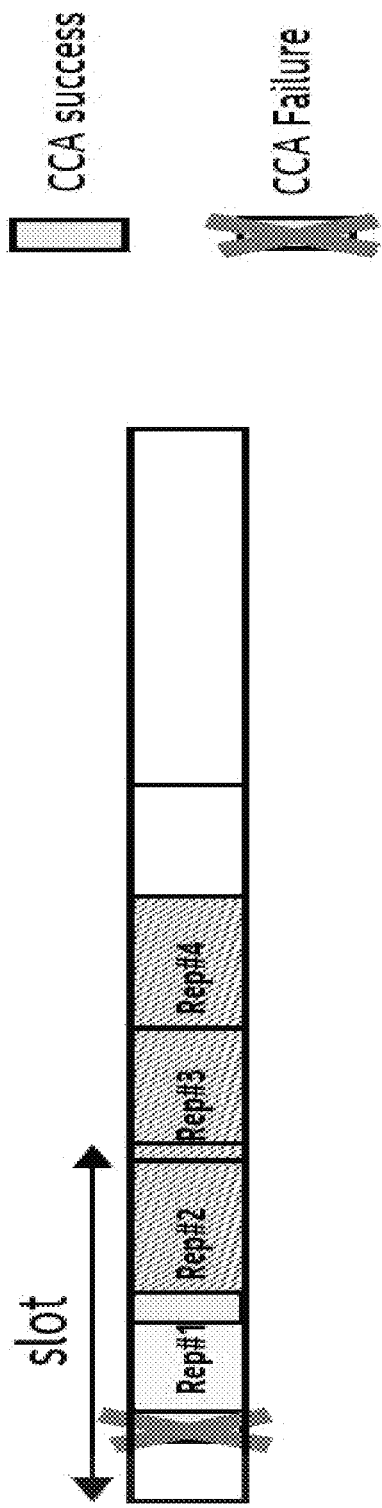
FIG. 7 illustrates transmission occasions for LBT attempts in accordance with some aspects.

In some embodiments, for the CG PUSCH type B repetition scheme, as in Rel. 16 NR-U, depending on whether the TDRAs fall within a UE's COT or a gNB's COT, a UE may initially perform a Cat-2 or Cat-4 LBT for the first transmission of a contiguous set of back-to-back PUSCHs depending on when a UE is provided with ChannelAccessMode-r/6='semistatic' by SIB1 or dedicated configuration or not, respectively. FIG. 7 illustrates transmission occasions for LBT attempts in accordance with some aspects. FIG. 7 provides an example when the number of consecutive repetitions K=4 is reinterpreted as the number of transmission occasions over which a UE could attempt LBT.

Figure 8:
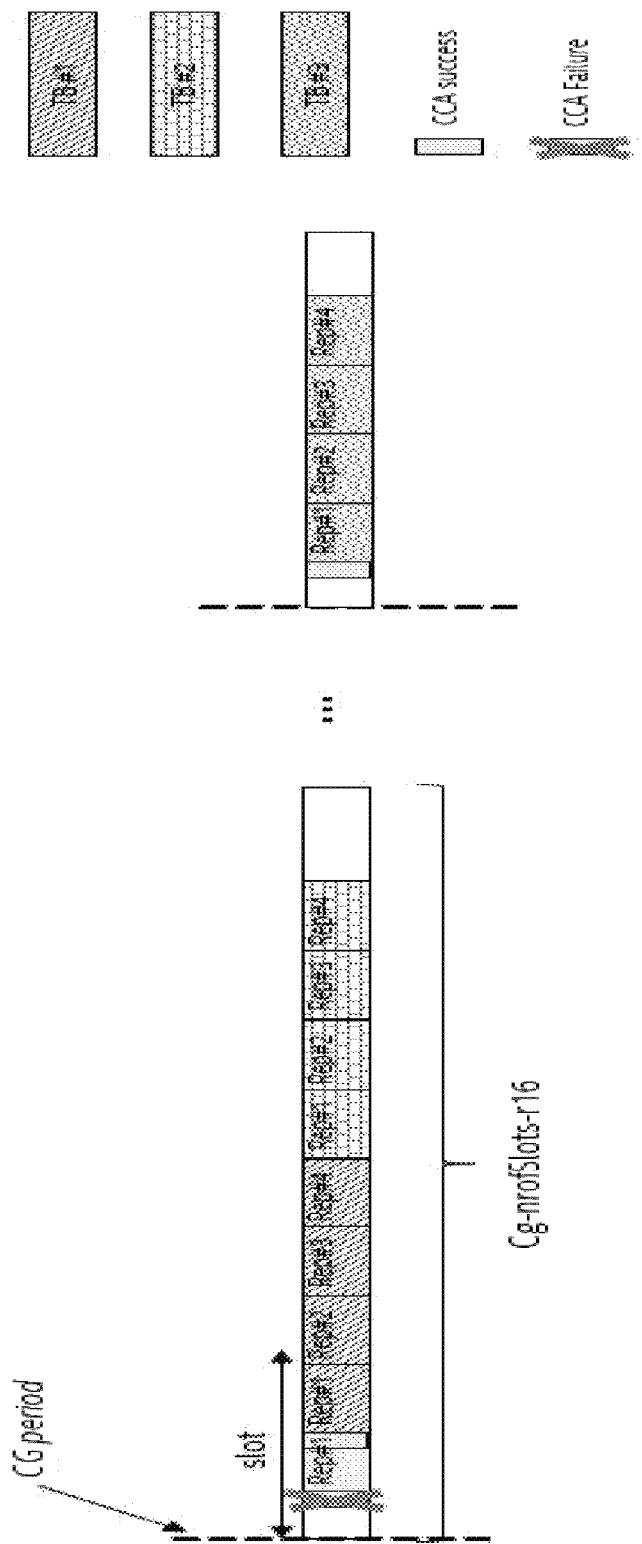
FIG. 8 illustrates an enhanced CG PUSCH type B repetition scheme in accordance with some aspects.

In some embodiments, for the CG PUSCH type B repetition scheme, the RRC parameter Cg-nrorfSlots-r16 defined in NR-U indicates the number of slots over which consecutive PUSCH transmissions may span that can be reused to enhance the CG PUSCH type B repetition scheme. In particular, this parameter can be used to indicate, similar to as used in NR-U, the number of slots over which up to K consecutive PUSCH transmissions and/or up to K repetitions per TB may span. Given the SLIV for the first repetition of the first TB in the first slot, indicating the length and the starting symbol of that PUSCH transmission: all the other consecutive PUSCHs transmitted back-to-back across Cg-nrofSlots-r16 slots have the same length of the first repetition within the first slot. In other embodiments, for the CG PUSCH type B repetition scheme, the number of back-to-back consecutive repetitions is reinterpreted as the maximum number or the number of repetitions per TB, which can be performed over the time domain resources allocated per each period through parameter Cg-nrofSlots-r16. FIG. 8 illustrates an enhanced CG PUSCH type B repetition scheme in accordance with some aspects. In particular, FIG. 8 provides an example of an enhanced CG PUSCH type B repetition scheme in which Cg-nrofSlots-r16=4 and the number of repetitions is set to K=4.

In some embodiments, if the CCA procedure fails, a UE may postpone the transmission of the repetitions scheduled for the back-to-back transmissions that were scheduled to be transmitted if the CCA procedure would have succeeded to the first transmission occasion for which the UE succeeds the CCA procedure. In another option, if the CCA procedure fails, a UE may drop/puncture the transmission of the repetitions scheduled for the consecutive transmissions that were scheduled to be transmitted if the CCA procedure would have succeeded. In another option, it may be left up to UE implementation on how to handle the case when the CCA procedure fails.

In some embodiments, for the CG PUSCH type B repetition scheme, repetitions of a specific TB may occur across periodicities. In some embodiments, when a UE is provided with ChannelAccessMode-r6 'semistatic' by SIB1 or a dedicated configuration by higher layer RRC signaling, whether the CG PUSCH transmission (which may include multiple TBs, multiple repetitions of a single TB or both) is performed within a gNB's FFP or a UE's FFP, if a PUSCH transmission lies or overlaps within a gNB's idle period or a UE's idle period, respectively, that PUSCH transmission and any following ones may be dropped. In one embodiment, the dropped PUSCH transmissions are punctured, and flushed out of the UE's buffer. In one alternative, the dropped PUSCH transmissions may be resumed and performed in the following transmission occasion either within a following gNB's or a UE's FFP. In some embodiments, when a UE is provided with ChannelAccessMode-r16='semistatic' by SIB1 or a dedicated configuration by higher layer RRC signaling, any time domain resource that lies or overlaps within either the following idle period of an active gNB's FFP or an active UE's FFP (where for active, it is intended a FFP that has been able to be acquired by the initiating device, by succeeding in the related CCA procedure described in TS 37.213) are considered invalid resources, and no transmission is allowed to be performed.

The embodiments above are not mutually exclusive, and one or more of them may apply together.

Enhanced NR-U Repetition Scheme

In some embodiments, the NR-U repetition scheme is enhanced by enabling segmentation. In one option, the RRC parameter Cg-nrofPUSCH-InSlot-r16 is ignored, while the RRC parameter Cg-nrorfSlots-r16 is reused. In this case, Cg-nrofSlots-r16 indicates the number of slots over which up to K consecutive PUSCH transmissions and/or up to K repetitions per TB may span. Given the SLIV for the first repetition of the first TB in the first slot, indicating the length and the starting symbol of that PUSCH transmission all the other consecutive PUSCHs transmitted back-to-back across Cg-nrofSlots-r16 slots have the same length of the first repetition within the first slot. This option may be the same as that obtained by supporting some of the above embodiments to enhance the CG PUSCH type B repetition scheme.

In one option, both the RRC parameter Cg-nrofPUSCH-InSlot-r16 and Cg-nrofSlots-r16 are reused. In this case, an additional PUSCH transmission may be added within the symbols left empty between the end of a slot and the subsequent one, when both slots belong to the Cg-nrofSlots-r16 slots configured for UL transmission. Given the SLIV for the first repetition of the first TB in the first slot, indicating the length and the starting symbol of that PUSCH transmission, all the other consecutive PUSCHs transmitted back-to-back across Cg-nrofSlots-r16 slots have the same length of the first repetition within the first slot (except for those that lies between slot boundaries, which may have a different length).

Figure 9:
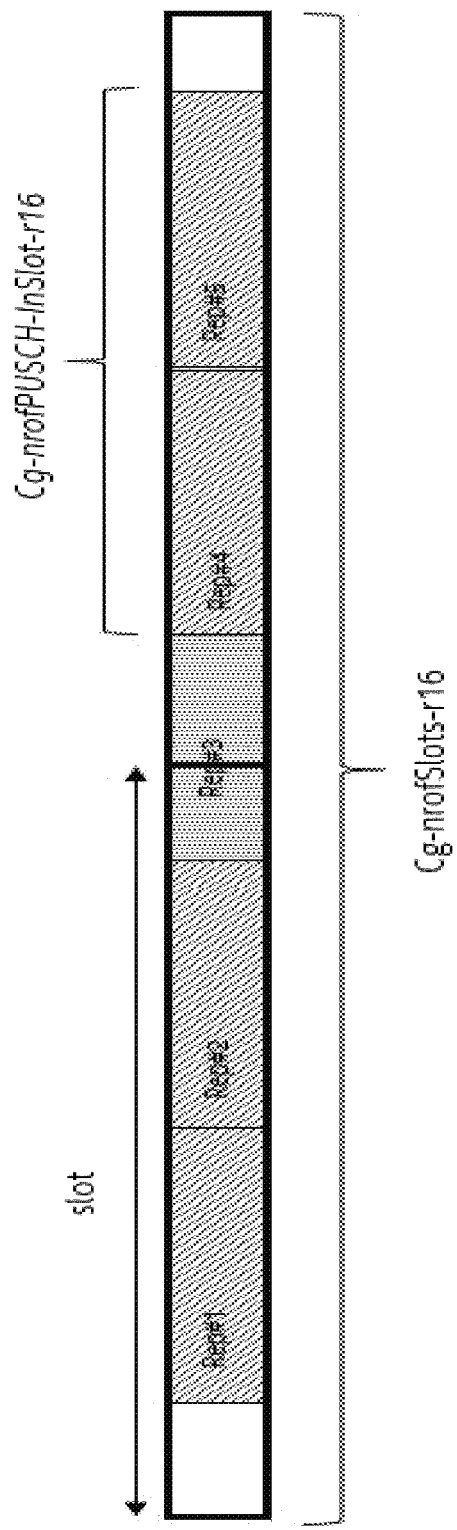
FIG. 9 illustrates an enhanced NR-U repetition scheme in accordance with some aspects.

FIG. 9 illustrates an enhanced NR-U repetition scheme in accordance with some aspects. In particular, FIG. 9 provides an example of the enhanced NR-U repetition scheme when both Cg-nrofPUSCH-InSlot-r16 and Cg-nrofSlots-r16 are reused, and the unused empty symbols across clusters of back-to-back PUSCH transmissions are used for an additional PUSCH transmission.

In some embodiments, when a UE is provided with ChannelAccessMode-r16='semistatic' by SIB1 or a dedicated configuration by higher layer RRC signaling, whether the CG PUSCH transmission (which may include multiple TBs, multiple repetitions of a single TB or both) is performed within a gNB's FFP or a UE's FFP, if a PUSCH transmission lies or overlaps within a gNB's idle period or a UE's idle period, respectively, that PUSCH transmission and any following ones may be dropped. In one embodiment, the dropped PUSCH transmissions are punctured, and flushed out of the UE's buffer. Alternatively, the dropped PUSCH transmissions may be resumed and performed in the following transmission occasion either within a following gNB's or a UE's FFP. In some embodiments, when a UE is provided with ChannelAccessMode-r16 'semistatic' by SIB1 or a dedicated configuration by higher layer RRC signaling, any time domain resource that lies or overlaps within either the following idle period of an active gNB's FFP or an active UE's FFP (where for active, it is intended a FFP that has been able to be acquire by the initiating device, by succeeding the related CCA procedure described in TS 37.213) are considered invalid resources, and no transmission is allowed to be performed.

Enhancements to Prevent an Orphan Symbol

In Rel. 16 URLLC, segmentation is used for a CG PUSCH type B repetition scheme when a PUSCH transmission lies across a slot boundary. In segmentation the PUSCH is split into two actual repetitions. However, according to the Rel. 16 design, a UE should skip the transmission of a PUSCH if this would have 1-symbol length for better efficiency, which is labelled here as an orphan symbol. However, if this is allowed in Rel. 17 when operating URLLC in unlicensed spectrum, a UE may be forced to unnecessarily perform a CCA procedure given that there may be a gap larger than 16 μs between back-to-back transmissions.

In some embodiments, if a 1 symbol PUSCH transmission may occur as a result of segmentation either within or without a gNB's COT, and if this transmission would not be the last PUSCH transmission within a COT, one of the following options may be supported; a CG uplink control information (CG-UCI) is used to fill the orphan symbol; DMRS transmission or cyclic prefix of the first symbol of the PUSCH causing the orphan symbol or the prior or later PUSCH is used to fill the gap; it is left up to gNB to prevent the orphan symbol from occurring; it is up to the UE to fill up the gap; or if the orphan symbol is the last symbol of a slot, then a UE rate matches the prior repetition/PUSCH transmission to that causing the orphan symbol so that to fill up the unused resources. If the orphan symbol is the first symbol of a slot, then a UE rate matches the subsequent repetition to that causing the orphan symbol so that to fill up the unused resources.

Figure 10:
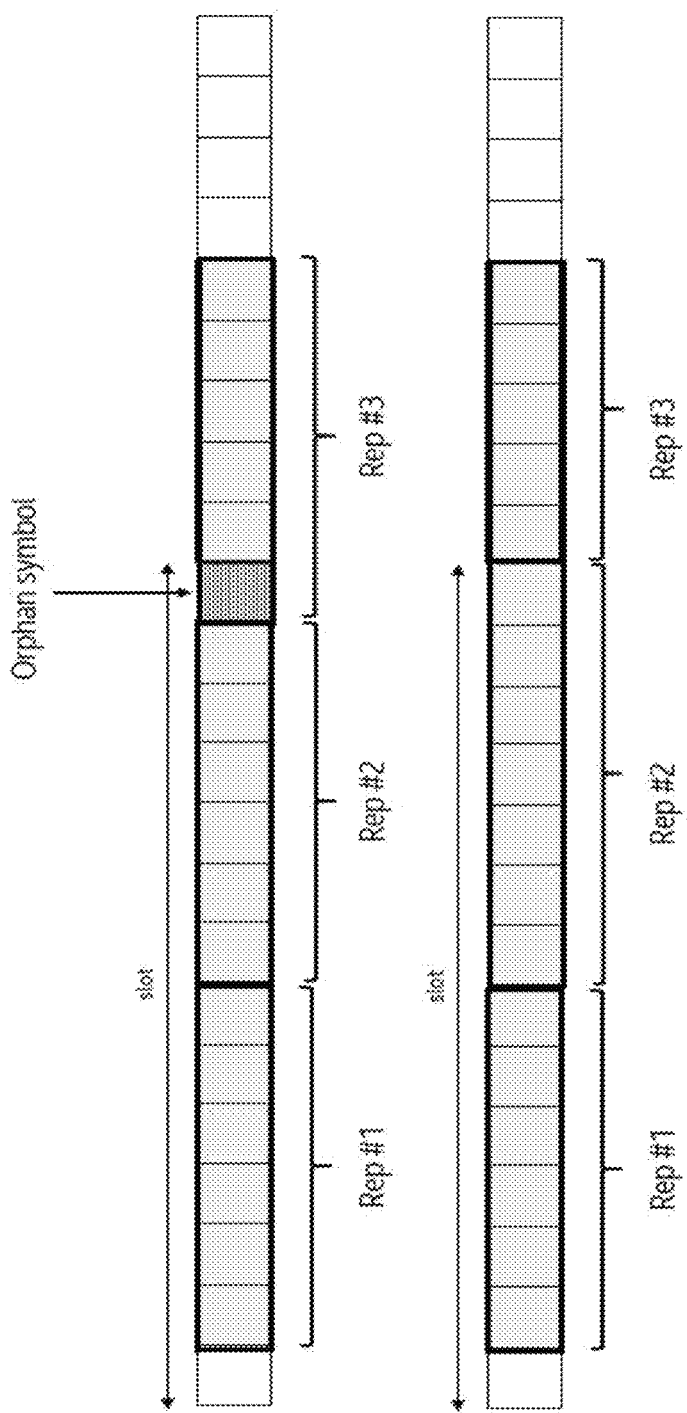
FIG. 10 illustrates rate-matching to fill an orphan symbol in accordance with some aspects.

FIG. 10 illustrates rate-matching to fill an orphan symbol in accordance with some aspects. In particular, FIG. 10 provides an example of when the orphan symbol is the last symbol of a slot, and how this may be filled up by rate matching the prior repetition (Rep #2 in this specific example) that caused the orphan symbol.

Related to the above embodiment, a field in the downlink control information (DCI) or a parameter associated with an entry in TDRA table may be introduced that enables or disables the handling of the orphan symbol. For the latter option, each entry in the TDRA table along with the SLIV, K2, mapping type, number of repetitions can be extended with a flag for enabling or disabling the orphan symbols handling. Moreover, if more than one option of orphan symbol handling is specified, the parameter can indicate one of the available options.

Enhancements on the Instances of Time when CG-UCI is Transmitted

In some embodiments, if segmentation is applied to enhance the NR-U repetition scheme and/or the CG PUSCH type B repetition scheme is used, when a PUSCH transmission spanning across a slot boundary is split into two, and the CG-UCI is piggybacked in every PUSCH transmissions as in Rel. 16 NR-U, then; the CG-UCI is transmitted in all actual repetitions or slots of the PUSCH that is segmented; the CG-UCI is only transmitted in first slot of the segmented PUSCH; the CG-UCI is only transmitted in second slot of the segmented PUSCH; or a UE is not expected to piggyback the CG-UCI on a PUSCH repetition that is smaller than the nominal repetition.

In some embodiments, when the cg-RetransmissionTimer is not configured or regardless of whether or not the cg-RetransmissionTimer is configured, the CG-UCI is piggybacked in every PUSCH or is only piggybacked in the first transmitted PUSCH of the K repetitions per each TB and on each periodicity over which the repetitions may span through.

In some embodiments, the CG-UCI is piggybacked in a PUSCH based on the above embodiments only when cg-RetransmissionTimer is configured. In this case, the CG-UCI is never piggybacked in any of the PUSCH transmissions if the cg-RetransmissionTimer is not configured.

In another embodiment, a new RRC parameter is introduced that indicates whether or not a CG-UCI is piggybacked in a PUSCH based on the above embodiments when the cg-RetransmissionTimer is configured. In this case, when the CG-UCI is configured to be piggybacked with a PUSCH, the CG-UCI may contain information related to the COT sharing indication, but may not carry information related to one or more of the following: Hybrid Automatic Repeat Request (HARQ)-ID, RV, and New Data Indicator (NDI). As an alternative, when the CG-UCI is configured to not be piggybacked in any of the PUSCH transmissions, the UE is not allowed to share its COT.

In another embodiment, the CG-UCI is always piggybacked in a PUSCH based on the above embodiments when the cg-RetransmissionTimer is not configured. In this case, when the CG-UCI is configured to be piggybacked with a PUSCH, the CG-UCI may contain information related to the COT sharing indication, but may not carry information related to one or more of the following: HARQ-ID, RV, and NDI. As an alternative, when the CG-UCI is configured to not be piggybacked in any of the PUSCH transmissions, the UE is not allowed to share its COT.

Enhancements on the when Downlink Channel Information-Downlink Feedback Information (DCI-DFI) is Used In some embodiments, when the cg-RetransmissionTimer is not configured or regardless of whether the cg-RetransmissionTimer is or is not configured, the DCI-DFI is used when operating in the unlicensed spectrum. In this case, it may be up to the UE on when to automatically retransmit a CG PUSCH transmission on the same or different CG configuration or via a PUSCH scheduled by UL grant.

In another embodiment, when the cg-RetransmissionTimer is not configured, a new RRC parameter is introduced that indicates whether or not a DCI-DFI is used when operating in the unlicensed spectrum. In this case, if the new RRC parameter is configured so that the DCI-DFI is used, it may be up to the UE on when to automatically retransmit a CG PUSCH transmission on the same or different CG configuration or via a PUSCH scheduled by UL grant.

In another embodiment, when the cg-RetransmissionTimer is not configured then the DCI-DFI is not used in URLLC when operating in the unlicensed spectrum. In this case, retransmission may only occur when scheduled through UL grant.

Enhancements on Calculation of the UCI Resource Elements (RE) when CG-UCI is Supported in a Repetition Scheme with the Use of Segmentation In some embodiments, when one of the repetition schemes that use segmentation described in prior embodiments is used, or simply if the Rel.16 type B repetition scheme is supported in unlicensed operation, and the CG-UCI is piggybacked in a PUSCH based also on some of the above embodiments and an HARQ-ACK feedback is not multiplexed on a CG-PUSCH, then the number of RE devoted to the CG-UCI transmission described in TS 38.212 Sec. 6.3.2.4.1.4 is modified, and calculated as follows:

$$Q'_{CG-UCI} = \min\left\{\left\lceil \frac{(O_{CG-UCI} + L_{CG-UCI}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil,\right.$$

$$\left.\left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l)\right\}$$

where $O_{CG-UC}$ is the number of CG-UCI bits;
$L_{CG-UCI}$ is the number of cyclic redundancy code (CRC) bits for the CG-UCI determined according to Clause 6.3.1.2.1;
$\beta_{offset}^{PUSCH} = \beta_{offset}^{CG-UCI}$.
$C_{UL-SCH}$ is the number of code blocks for the uplink shared channel (UL-SCH) of the PUSCH transmission;
$K_r$ is the r-th code block size for UL-SCH of the PUSCH transmission;
$M_{sc,nominal}^{UCI}(l)$ is the number of resource elements that can be used for transmission of UCI in OFDM symbol l, for l=0, 1, 2, . . . , $N_{symb,nominal}^{PUSCH}-1$, in the PUSCH transmission assuming a nominal repetition without segmentation, and $N_{symb,nominal}^{PUSCH}$ is the total number of OFDM symbols in a nominal repetition of the PUSCH, including all OFDM symbols used for a demodulation reference signal (DMRS);
for any OFDM symbol that carries a DMRS of the PUSCH assuming a nominal repetition without segmentation, $M_{sc,nominal}^{UCI}(l)=0$;
for any OFDM symbol that does not carry a DMRS of the PUSCH assuming a nominal repetition without segmentation, $M_{sc,nominal}^{UCI}(l)=M_{sc}^{PUSCH}-M_{sc,nominal}^{PT-RS}(l)$ where $M_{sc,nominal}^{PT-RS}(l)$ is the number of subcarriers in OFDM symbol l that carries the Phase Tracking Reference Signal (PTRS), in the PUSCH transmission assuming a nominal repetition without segmentation;
$M_{sc,actual}^{UCI}(l)$ is the number of resource elements that can be used for transmission of the UCI in OFDM symbol l, for l=0, 1, 2, . . . , $N_{symb,actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for DMRS;
for any OFDM symbol that carries DMRS of the actual repetition of the PUSCH transmission, $M_{sc,actual}^{UCI}(l)=0$;
for any OFDM symbol that does not carry DMRS of the actual repetition of the PUSCH transmission, $M_{sc,actual}^{UCI}(l)=M_{sc}^{PUSCH}-M_{sc,actual}^{PT-RS}(l)$ where $M_{sc,actual}^{PT-RS}(l)$ is the number of subcarriers in OFDM symbol l that carries the PTRS, in the actual repetition of the PUSCH transmission;
α is configured by the higher layer parameter scaling.

In some embodiments, when one of the repetition schemes that use segmentation described in prior embodiments is used, or simply if the Rel. 16 type B repetition scheme is supported in unlicensed operation, and the CG-UCI is piggybacked in a PUSCH based also on some of the above embodiments and HARQ-ACK feedback is multiplexed and jointly encoded on a CG-PUSCH, then the number of RE devoted to the HARQ-ACK and CG-UCI transmission described in TS 38.212 Sec. 6.3.2.4.1.5 is modified, and calculated as follows:

$$Q'_{ACK} = \min\left\{\left\lceil \frac{(O_{ACK} + O_{CG-UCI} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

$$\left. \left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l) \right\}$$

where $O_{ACK}$ is the number of HARQ-ACK bits;

$O_{CG-UCI}$ is the number of CG-UCI bits;

if $O_{ACK}+O_{CG-UCI}>360$, $L_{ACK}=11$; otherwise $L_{ACK}$ is the number of CRC bits for the HARQ-ACK and CG-UCI determined according to Clause 6.3.1.2.1;

$\beta_{offset}^{PUSCH}=\beta_{offset}^{HARQ-ACK}$;

$C_{UL-SCH}$ is the number of code blocks for the UL-SCH of the PUSCH transmission;

$K_r$ is the r-th code block size for the UL-SCH of the PUSCH transmission;

$M_{sc,nominal}^{UCI}(l)$ is the number of resource elements that can be used for transmission of UCI in OFDM symbol l, for l=0, 1, 2, . . . , $N_{symb,nominal}^{PUSCH}-1$, in the PUSCH transmission assuming a nominal repetition without segmentation, and $N_{symb,nominal}^{PUSCH}$ is the total number of OFDM symbols in a nominal repetition of the PUSCH, including all OFDM symbols used for the DMRS;

for any OFDM symbol that carries the DMRS of the PUSCH assuming a nominal repetition without segmentation, $M_{sc,nominal}^{UCI}(l)=0$;

for any OFDM symbol that does not carry the DMRS of the PUSCH assuming a nominal repetition without segmentation, $M_{sc,nominal}^{UCI}(l)=M_{sc}^{PUSCH}-M_{sc,nominal}^{PT-RS}(l)$ where $M_{sc,nominal}^{PT-RS}(l)$ is the number of subcarriers in OFDM symbol l that carries PTRS, in the PUSCH transmission assuming a nominal repetition without segmentation;

$M_{sc,actual}^{UCI}(l)$ is the number of resource elements that can be used for transmission of the UCI in OFDM symbol l, for l=0, 1, 2, . . . , $N_{symb,actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for the DMRS;

for any OFDM symbol that carries DMRS of the actual repetition of the PUSCH transmission, $M_{sc,actual}^{UCI}(l)=0$;

for any OFDM symbol that does not carry the DMRS of the actual repetition of the PUSCH transmission, $M_{sc,actual}^{UCI}(l)=M_{sc}^{PUSCH}-M_{sc,actual}^{PT-RS}(l)$ where $M_{sc,actual}^{PT-RS}(l)$ is the number of subcarriers in OFDM symbol l that carries PTRS, in the actual repetition of the PUSCH transmission;

α is configured by higher layer parameter scaling.

Figure 11:
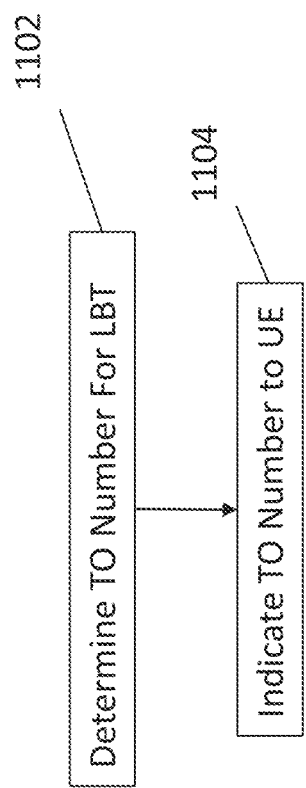
FIG. 11 illustrates a flowchart of 5$^{th}$ generation NodeB (gNB) listen-before-talk (LBT) determination in accordance with some aspects.

FIG. 11 illustrates a flowchart of 5th generation NodeB (gNB) listen-before-talk (LBT) determination in accordance with some aspects. FIG. 11 may be implemented by a gNB in some embodiments. Other operations may be present, but are not shown for convenience. For example, the process may include, at operation 1102, determining, based on a number of consecutive repetitions coinciding with a number of slots over which the consecutive repetitions span, a number of transmission occasions over which a UE is able to attempt a LBT operation for a CG PUSCH transmission. At operation 1104, the gNB may encode a message for transmission to a UE that includes an indication of the number of transmission occasions over which the UE may attempt the LBT operation for the CG PUSCH transmission.

Figure 12:
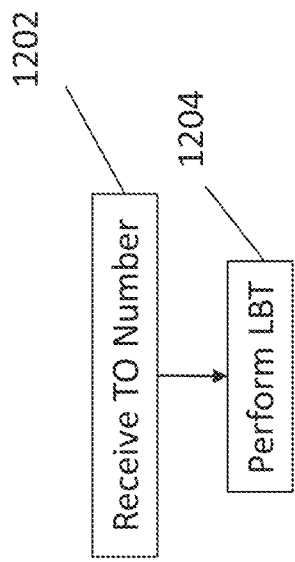
FIG. 12 illustrates a flowchart of initiation of a UE LBT procedure in accordance with some aspects.

FIG. 12 illustrates a flowchart of initiation of a UE LBT procedure in accordance with some aspects. FIG. 12 may be implemented by a UE in some embodiments. Other operations may be present, but are not shown for convenience. In this example, the process includes, at operation 1202, receiving and decoding from a gNB a message that includes a number of transmission occasions over which the UE may attempt a LBT operation for a CG PUSCH transmission in which the number of transmission occasions is determined based on a number of consecutive repetitions coinciding with a number of slots over which the consecutive repetitions span. At operation 1204, the UE performs the LBT operation for the CG PUSCH transmission based on the received message.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising:
   processing circuitry configured to:
      decode, from a 5$^{th}$ generation NodeB (gNB), radio resource control (RRC) signaling that contains an RRC parameter of repetitions for at least one of configured grant (CG) physical uplink shared channel (PUSCH) type A transmissions or CG PUSCH type B transmissions for Ultra-Reliable Low-Latency Communication (URLLC) PUSCH transmissions in an Unlicensed Spectrum;
      reinterpret a number of consecutive PUSCH repetitions in the RRC parameter as a number of transmission occasions over which the UE is able to attempt a listen-before-talk (LBT) procedure, the number of consecutive PUSCH repetitions for a CG-PUSCH type A transmission being a number of slots over which the consecutive PUSCH repetitions span;
      attempt the LBT procedure based on the RRC parameter; and
      encode, for transmission to the gNB, a set of consecutive PUSCH repetitions in accordance with the RRC parameter in response to the LBT procedure being successful; and
   a memory configured to store the RRC parameter.

2. The apparatus of claim 1, wherein the processing circuitry is configured to encode the set of consecutive PUSCH repetitions in response to the set of repetitions not being separated in time for more than 16 µs.

3. The apparatus of claim 1, wherein for a CG PUSCH type A repetition scheme:
   the RRC signaling further comprises a Start and Length Indicator Value (SLIV) for a first repetition in a first slot that indicates a length and a starting symbol of an associated PUSCH transmission,
   consecutive PUSCH transmissions transmitted within a particular slot have the length of the first repetition within the first slot, and
   initial repetitions within consecutive slots after the first slot have the SLIV within the first slot.

4. The apparatus of claim 1, wherein for a CG PUSCH type A repetition scheme, the processing circuitry is configured to decode, from the gNB, dynamic signaling that introduces a gap larger than 16 µs across repetitions or a group of consecutive repetitions to permit type 2B channel access to be performed in response to the gap being larger than 16 µs but less than 25 µs or type 2A channel access to be performed in response to the gap being larger than 25 µs.

5. The apparatus of claim 1, wherein the processing circuitry is configured to:
   determine that Clear Channel Assessment (CCA) of the LBT procedure has failed; and
   in response to a determination that the CCA has failed, one of:
      postpone transmission of consecutive repetitions scheduled to be transmitted in response to success of the CCA until a next transmission occasion occurs for which the CCA has succeeded, or
      puncture at least one of the consecutive repetitions scheduled to be transmitted in response to success of the CCA.

6. The apparatus of claim 1, wherein for a CG PUSCH type A repetition scheme, the processing circuitry is configured to encode repetitions of a specific transmission block across periodicities.

7. The apparatus of claim 1, wherein for a CG PUSCH type A repetition scheme, the processing circuitry is configured to, when provided with ChannelAccessMode-r16='semistatic' by system information block1 (SIB1) or a dedicated configuration by the RRC signaling:
   determine whether a particular PUSCH repetition lies within or overlaps with a following idle period for the gNB or UE for PUSCH repetitions performed respectively within a Fixed Frame Period (FFP) of the gNB or UE; and
   in response to a determination that the particular PUSCH repetition lies within or overlaps with the following idle period for the gNB or UE, one of:
      drop the particular PUSCH repetition and PUSCH repetitions following the particular PUSCH repetition, or
      resume the particular PUSCH repetition and PUSCH repetitions following the particular PUSCH repetition in a following transmission occasion.

8. The apparatus of claim 1, wherein for a CG PUSCH type B repetition scheme:
   the RRC parameter comprises Cg-nrofSlots-r16, which indicates a number of slots over which up to at least one of K consecutive PUSCH transmissions or K repetitions per transmission block (TB) is able to span,
   the RRC signaling further comprises a Start and Length Indicator Value (SLIV) for a first repetition of a first TB in a first slot that indicates a length and a starting symbol of an associated PUSCH transmission, and
   consecutive PUSCH transmissions transmitted across Cg-nrofSlots-r16 slots have the length of the first repetition within the first slot.

9. The apparatus of claim 8, wherein the processing circuitry is configured to ignore RRC parameter Cg-nrofPUSCH-InSlot-r16 in the RRC signaling.

10. The apparatus of claim 8, wherein:
    the RRC parameter further comprises Cg-nrofPUSCH-InSlot-r16, and
    the processing circuitry is configured to encode an additional PUSCH transmission within symbols left empty between an end of a particular slot and a subsequent slot when both the particular slot and subsequent slot belong to Cg-nrofSlots-r16 slots configured for an uplink (UL) transmission.

11. The apparatus of claim 1, wherein for a CG PUSCH type B repetition scheme:
the processing circuitry is configured to segment a nominal PUSCH transmission into multiple actual PUSCH transmissions in response to the nominal PUSCH transmission lying across a slot boundary, and
segmentation of the nominal PUSCH transmission is independent of whether one of the actual PUSCH transmissions is an orphan symbol having a 1-symbol length when the one of the actual PUSCH transmissions is not a last PUSCH transmission within a channel occupancy time (COT).

12. The apparatus of claim 11, wherein at least one of:
the orphan symbol contains CG uplink control information (CG-UCI), or a demodulation reference symbol (DMRS) transmission or a cyclic prefix of a first symbol of the nominal PUSCH transmission, or
the processing circuitry is configured to rate match a prior PUSCH transmission when the orphan symbol is a last symbol of a particular slot or rate match a subsequent PUSCH transmission when the orphan symbol is a first symbol of the particular slot.

13. The apparatus of claim 11, wherein the processing circuitry is configured to decode, from the gNB, a field in downlink control information that indicates whether segmentation of the nominal PUSCH transmission is independent of whether the one of the actual PUSCH transmissions is the orphan symbol.

14. The apparatus of claim 1, wherein the processing circuitry is configured to:
segment a nominal PUSCH transmission into multiple actual PUSCH transmissions in response to the nominal PUSCH transmission lying across a slot boundary of contiguous slots, and
one of:
encode, for transmission to the gNB, CG uplink control information (CG-UCI) in one of:
each actual PUSCH transmission or slot in which the actual PUSCH transmissions are segmented, or only one of the slots in which the actual PUSCH transmissions is transmitted, or
avoid transmitting the CG-UCI in the actual PUSCH transmissions.

15. The apparatus of claim 1, wherein the processing circuitry is configured to:
determine whether cg-RetransmissionTimer is configured; and
encode, for transmission to the gNB, CG uplink control information (CG-UCI) in response to a determination that the cg-RetransmissionTimer is configured.

16. The apparatus of claim 1, wherein the processing circuitry is configured to:
determine that the UE is operating in the Unlicensed Spectrum;
determine whether cg-RetransmissionTimer is configured; and
in response to a determination that cg-RetransmissionTimer is not configured:
determine that downlink channel information-downlink feedback information (DCI-DFI) is not used; and
limit use PUSCH retransmission to when scheduled through an uplink grant.

17. An apparatus for a 5$^{th}$ generation NodeB (gNB), the apparatus comprising:
processing circuitry configured to:
encode, for transmission to a user equipment (UE), radio resource control (RRC) signaling that contains an RRC parameter of repetitions for at least one of configured grant (CG) physical uplink shared channel (PUSCH) type A transmissions or CG PUSCH type B transmissions for Ultra-Reliable Low-Latency Communication (URLLC) PUSCH transmissions in an Unlicensed Spectrum, a number of consecutive PUSCH repetitions in the RRC parameter being reinterpreted as a number of transmission occasions over which the UE is able to attempt a listen-before-talk (LBT) procedure, the number of consecutive PUSCH repetitions for a CG-PUSCH type A transmission being a number of slots over which the consecutive PUSCH repetitions span; and
decode, from the UE, a set of consecutive PUSCH repetitions in accordance with the RRC parameter in response to the LBT procedure being successful; and
a memory configured to store the RRC parameter.

18. The apparatus of claim 17, wherein at least one of:
at least one of the set of consecutive PUSCH repetitions is a nominal PUSCH transmission segmented into multiple actual PUSCH transmissions lying across a slot boundary, the actual PUSCH transmissions comprise an orphan symbol having a 1-symbol length, and the orphan symbol contains a demodulation reference symbol (DMRS) transmission or a cyclic prefix of a first symbol of the nominal PUSCH transmission, or
the processing circuitry is configured to:
indicate to the UE whether cg-RetransmissionTimer is configured, and at least one of:
decode, from the UE, CG uplink control information (CG-UCI) in response to the cg-RetransmissionTimer being configured, or
in response to a determination that cg-RetransmissionTimer not being configured: encode scheduling for PUSCH retransmissions in an uplink grant for transmission to the UE, the PUSCH retransmissions limited to when scheduled through the uplink grant, downlink channel information-downlink feedback information (DCI-DFI) not being used.

19. A non-transitory computer-readable storage medium that stores instructions for execution by one or more processors of a user equipment (UE), the one or more processors to configure the UE to, when the instructions are executed:
decode, from a 5$^{th}$ generation NodeB (gNB), radio resource control (RRC) signaling that contains an RRC parameter of repetitions for at least one of configured grant (CG) physical uplink shared channel (PUSCH) type A transmissions or CG PUSCH type B transmissions for Ultra-Reliable Low-Latency Communication (URLLC) PUSCH transmissions in an Unlicensed Spectrum;
reinterpret a number of consecutive PUSCH repetitions in the RRC parameter as a number of transmission occasions over which the UE is able to attempt a listen-before-talk (LBT) procedure, the number of consecutive PUSCH repetitions for a CG-PUSCH type A transmission being a number of slots over which the consecutive PUSCH repetitions span;
attempt the LBT procedure based on the RRC parameter; and encode, for transmission to the gNB, a set of consecutive PUSCH repetitions in accordance with the RRC parameter in response to the LBT procedure being successful.

20. The medium of claim 19, wherein the instructions, when executed, further cause the one or more processors to configure the UE to at least one of:
   segment a nominal PUSCH transmission into multiple actual PUSCH transmissions in response to the nominal PUSCH transmission lying across a slot boundary, one of the actual PUSCH transmissions is an orphan symbol having a 1-symbol length when the one of the actual PUSCH transmissions is not a last PUSCH transmission within a channel occupancy time (COT), and the orphan symbol contains a demodulation reference symbol (DMRS) transmission or a cyclic prefix of a first symbol of the nominal PUSCH transmission, or
   determine whether cg-RetransmissionTimer is configured, and at least one of:
      encode, for transmission to the gNB, CG uplink control information (CG-UCI) in response to a determination that the cg-RetransmissionTimer is configured, or
      determine that the UE is operating in the Unlicensed Spectrum, determine whether cg-RetransmissionTimer is configured, and in response to a determination that cg-RetransmissionTimer is not configured:
         determine that downlink channel information-downlink feedback information (DCI-DFI) is not used; and
         limit use PUSCH retransmission to when scheduled through an uplink grant.

* * * * *